US00RE51035E

(19) United States
(12) Reissued Patent
Elghrawi et al.

(10) Patent Number: US RE51,035 E
(45) Date of Reissued Patent: Sep. 15, 2026

(54) ELECTRICAL POWER SUPPLY DEVICE AND METHOD OF OPERATING SAME

(71) Applicant: Aptiv Technologies Limited, St. Michael (BB)

(72) Inventors: Mohamad Elghrawi, Sterling Heights, MI (US); Robert M. Voto, Clarkston, MI (US)

(73) Assignee: APTIV TECHNOLOGIES AG, Schaffhausen (CH)

(21) Appl. No.: 18/197,222

(22) Filed: May 15, 2023

Related U.S. Patent Documents

Reissue of:
(64) Patent No.: 11,342,705
Issued: May 24, 2022
Appl. No.: 16/934,471
Filed: Jul. 21, 2020

U.S. Applications:
(63) Continuation of application No. 16/006,463, filed on Jun. 12, 2018, now Pat. No. 10,752,189, which is a
(Continued)

(51) Int. Cl.
*H02M 3/04* (2006.01)
*G06F 1/26* (2006.01)
(Continued)

(52) U.S. Cl.
CPC ..... *H01R 13/5205* (2013.01); *G06F 1/266* (2013.01); *H01R 13/506* (2013.01);
(Continued)

(58) Field of Classification Search
CPC ..... H01R 13/506; H01R 13/5205; H01R 13/5825; H01R 13/39; H01R 13/631;
(Continued)

(56) References Cited

U.S. PATENT DOCUMENTS 10,635,150 B2 4/2020 Elghrawi et al.
2010/0320836 A1 12/2010 Sweet et al.
(Continued)

FOREIGN PATENT DOCUMENTS

CN 101312869 A 11/2008
CN 101622612 A 1/2010
(Continued)

OTHER PUBLICATIONS

Extended European Search Report Received for Application No. 24158126.3; European Patent Office; mailed on Jul. 1, 2024; 10 Pages.
(Continued)

*Primary Examiner* — Joshua D Campbell
(74) *Attorney, Agent, or Firm* — Billion & Armitage

(57) ABSTRACT

An electrical power supply device is configured to communicate with a start-stop controller that automatically shuts down and restarts an internal combustion engine in a vehicle. The device includes a DC-DC power convertor and a device controller. The DC-DC power convertor is configured to produce a first voltage or a second voltage that is less than the first voltage. The device controller which causes the DC-DC power convertor to produce the first voltage in response to a run signal from the start-stop controller and also causes the DC-DC power convertor to produce the second voltage in response to a stop signal from the start-stop controller.

16 Claims, 2 Drawing Sheets

Related U.S. Application Data continuation-in-part of application No. 15/954,851, filed on Apr. 17, 2018, now Pat. No. 10,635,150.

(51) Int. Cl.

| | |
|---|---|
| ***H01R 13/506*** | (2006.01) |
| ***H01R 13/52*** | (2006.01) |
| ***H01R 13/58*** | (2006.01) |
| ***H01R 13/59*** | (2006.01) |
| ***H01R 13/631*** | (2006.01) |
| ***H01R 43/20*** | (2006.01) |
| ***H02J 7/00*** | (2006.01) |
| ***H02M 3/00*** | (2006.01) |

(52) U.S. Cl.
CPC ..... *H01R 13/5825* (2013.01); *H01R 13/59* (2013.01); *H01R 13/631* (2013.01); *H01R 43/20* (2013.01); *H02J 7/865* (2026.01); *H02M 3/00* (2013.01)

(58) Field of Classification Search
CPC ..... H01R 43/20; H02J 7/0068; H02M 3/00; G06F 1/266
See application file for complete search history.

(56) References Cited

U.S. PATENT DOCUMENTS

| | | | | |
|---|---|---|---|---|
| 2012/0025761 | A1* | 2/2012 | Takada | H02J 50/12 320/108 |
| 2013/0320931 | A1 | 12/2013 | Yoshida et al. | |
| 2014/0184285 | A1 | 7/2014 | Dunipace | |
| 2015/0251690 | A1* | 9/2015 | Yamamoto | H02P 29/0241 318/400.21 |
| 2015/0258946 | A1 | 9/2015 | Namuduri et al. | |
| 2016/0181921 | A1 | 6/2016 | Zhang et al. | |
| 2018/0079314 | A1* | 3/2018 | Kashyap | H02M 3/04 |
| 2018/0275174 | A1* | 9/2018 | Renner | G01R 19/2513 |
| 2019/0006945 | A1* | 1/2019 | Takada | H02H 7/1213 |
| 2019/0317581 | A1* | 10/2019 | Elghrawi | G06F 1/266 |
| 2020/0139834 | A1 | 5/2020 | Miftakhov | |
| 2021/0273475 | A1 | 9/2021 | Qiu et al. | |
| 2021/0367278 | A1 | 11/2021 | Zhang et al. | |

FOREIGN PATENT DOCUMENTS

| | | | |
|---|---|---|---|
| CN | 107667462 | A | 2/2018 |
| DE | 102004023620 | A1 | 12/2005 |
| DE | 102004023620 | B4 | 1/2018 |
| EP | 3043442 | A1 | 7/2016 |
| EP | 3270480 | A1 | 1/2018 |
| JP | H10322806 | A | 12/1998 |
| JP | 3892528 | B2 | 3/2007 |
| JP | 2016213965 | A | 12/2016 |
| JP | 2017077847 | A | 4/2017 |
| JP | 2018033232 | A | 3/2018 |

OTHER PUBLICATIONS

U.S. Appl. No. 15/954,851 by Mohamad Elghrawi, et al., filed Apr. 17, 2018.

"Non Final Office Action received for China Patent Application No. 201910298626.8, mailed on Jun. 14, 2022", 13 pages.

"Notice of Decision to Grant Mailed on Nov. 2, 2022", 7 Pages.

English Abstract Translation of JP2016213965A, published Dec. 12, 2016.

English Abstract Translation of JP2018033232A, published Mar. 1, 2018.

European Office Action for EP Application No. 19168163.4, dated Dec. 15, 2021, 6 pages.

* cited by examiner

ELECTRICAL POWER SUPPLY DEVICE AND METHOD OF OPERATING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a continuation application and claims the benefit of co-pending U.S. patent application Ser. No. [16/203,717, filed Nov. 28, 2018] *16/006,463, filed Jun. 12, 2018*, which was a continuation-in-part application and claimed the benefit patent application Ser. No. 15/954,851, filed Apr. 17, 2018, the entire disclosure of each of which is hereby incorporated herein by reference.

TECHNICAL FIELD OF THE INVENTION

The invention generally relates to an electrical power supply device and method of operating the electrical power supply device.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
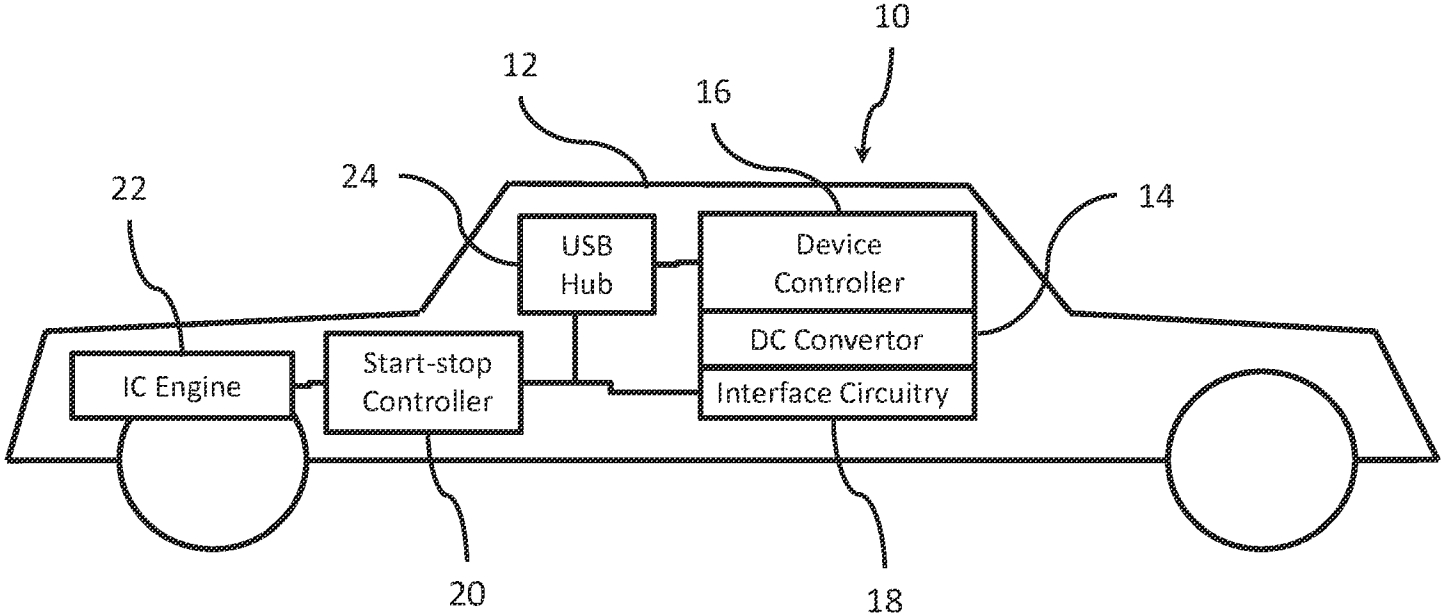
FIG. 1 is a schematic diagram of an electrical power supply device, according to one embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The Universal Serial Bus (USB) has evolved from a data interface capable of supplying limited power to a primary provider of power with a data interface. Today many devices charge or get their power from USB ports contained in laptops, cars, aircraft or even wall sockets. USB has become a ubiquitous power socket for many consumer devices such as cellular telephones, digital media players and/or other hand-held devices. Users utilize USB to fulfil their requirements not only in terms of data but also to provide power to, or charge, their devices simply, often without the need to load a driver, in order to carry out "traditional" USB functions.

The USB Power Delivery (PD) Specification enables the maximum functionality of USB by providing more flexible power delivery, e.g. for battery charging, along with data over a single cable. Its aim is to operate with and build on the existing USB ecosystem. The USB Power Delivery Specification 3.0 is published by the USB Implementer's Forum, Inc and is incorporated by reference herein.

In order to meet stringent fuel economy and emission standards, automotive original equipment manufacturers (OEMs) have included start-stop technology in their vehicles that automatically shuts down and restarts the internal combustion engine to reduce the amount of time the engine spends idling, thereby reducing fuel consumption and emissions of the vehicle.

OEMs have imposed requirements for a USB PD device powered by the vehicle battery requires it to continue to supply power to the consumer USB device during "Start/Stop" transients in which the vehicle battery voltage temporarily dips down to as low as 6 volts to simulate the vehicle cranking during a warm start. During this transient, the USB PD device is expected to continue to function with no disruption to the consumer experience. Supplying a consistent power level during the transient will cause the current input to the PD device to rise to levels that may exceed current limits of the wiring, connectors, and/or circuit protection devices, e.g. fuses, circuit breakers, of the PD device that would cause a disruption of the consumer experience, e.g. opening a fuse and thereby causing a shutdown of the PD device.

Some original equipment vehicle manufacturers (OEMs) monitor the power being supplied by the vehicle's electrical power system and inhibit the start-stop controller if the power supplied exceeds a power threshold.

A proposed innovative solution is to provide a signal from the vehicle to the USB PD device to indicate the power state of the vehicle. During the normal vehicle run mode the vehicle voltage is expected to be typically in the 12-14 volt range and a buck-boost DC-DC converter can generate a higher voltage output that has a greater voltage than the vehicle voltage that can be used by the consumer charging device in a "fast charge" mode. When the vehicle enters or intends to enter the stop/start mode, i.e. the vehicle has stopped moving and automatically turns off the engine, the change in mode is communicated by a signal from the vehicle to a controller in the USB PD device and the USB PD device then renegotiates the charging contact with the consumer device to provide a lower output voltage for "normal" charging operation. When the car subsequently experiences a crank cycle transient, the buck converter is able to maintain the lower output voltage without exceeding current limits and without interrupting the charging session. After the engine starts and returns to the run mode, the USB PD device is again notified via another signal and returns to the higher voltage output.

FIG. 1 illustrates an electrical power supply device, e.g. a Universal Serial Bus (USB) power delivery (PD) device, hereinafter referred to as the PD device 10 that is designed for use in a motor vehicle 12. The PD device 10 may be used to support battery charging of USB enabled devices in the vehicle 12 (not shown). The PD device 10 includes a boost-buck DC-DC power convertor, hereinafter referred to as the DC convertor 14, that receives an input voltage from a vehicle's electrical system. In other embodiments of the invention, the PD device 10 may be a buck only DC-DC power convertor. The output voltage can by one of at least two different voltages, a higher voltage, e.g. a 20-volt output to support a fast USB charge rate, or a lower voltage, e.g. a 5-volt output to support a normal USB charge rate.

The PD device 10 also includes a device controller 16 that is in communication with the DC convertor 14. The device controller 16 has one or more processors and memory. The processors may be microprocessors, application specific integrated circuits (ASIC), or built from discrete logic and timing circuits (not shown). Software instructions that program the processors may be stored in a non-volatile (NV) memory device (not shown). The NV memory device may be contained within the microprocessor or ASIC or it may be a separate device. Non-limiting examples of the types of NV memory that may be used include electrically erasable programmable read only memory (EEPROM), masked read only memory (ROM), and flash memory.

The PD device 10 also includes interface circuitry 18, such as a controller area network (CAN) transceiver, a local interconnect network (LIN) transceiver, a USB transceiver, and/or an input voltage detection circuit, e.g. an analog/digital convertor circuit, to allow the PD device 10 to establish electrical communication with other devices within the vehicle 12.

The PD device 10 is in communication with a start-stop controller 20 via the CAN transceiver or the LIN transceiver. The memory further includes instructions which cause the device controller 16 to command the DC convertor 14 to output the higher output voltage in accordance with the device controller 16 receiving a run signal from the start-stop controller 20. The reception of the run signal causes the device controller 16 to command the DC convertor 14 to output the lower output voltage in accordance with the device controller 16 receiving a stop signal from the start-stop controller 20. The run signal indicates that the IC engine 22 is running, therefore the input voltage will remain equal to or greater than the threshold voltage. The stop signal indicates that the IC engine 22 is not running and that the input voltage may drop to less than the threshold voltage, e.g. during a cranking transient.

In another embodiment, the PD device 10 is disposed within a USB port that is in communication with a USB hub 24 that is in communication with the start-stop controller 20. The memory includes instructions which cause the device controller 16 to command the DC convertor 14 to output the higher output voltage in accordance with the device controller 16 receiving a first USB signal from the USB hub 24 indicating that the USB hub 24 has received a run signal from the start-stop controller 20 and which cause the device controller 16 to command the DC convertor 14 to output the lower output voltage in accordance with the device controller 16 receiving a second USB signal from the USB hub 24 indicating that the USB hub 24 has received a stop signal from the start-stop controller 20.

In yet another embodiment, the PD device 10 includes an input voltage detection circuit that is in communication with the vehicle power supply, e.g. vehicle battery (not shown) and the device controller 16. The input voltage detection circuit is configured to determine the input voltage to the PD device 10 from the vehicle battery and transmit that information to the device controller 16. The memory includes additional instructions which cause the device controller 16 to command the DC convertor 14 to output the higher output voltage when the input voltage detection circuit determines that the input voltage is greater than a threshold voltage, e.g. 9.5 or 10 volts and which cause the device controller 16 to command the DC convertor 14 to output the lower output voltage when the input voltage detection circuit determines that the input voltage is less than the threshold voltage.

Figure 2:
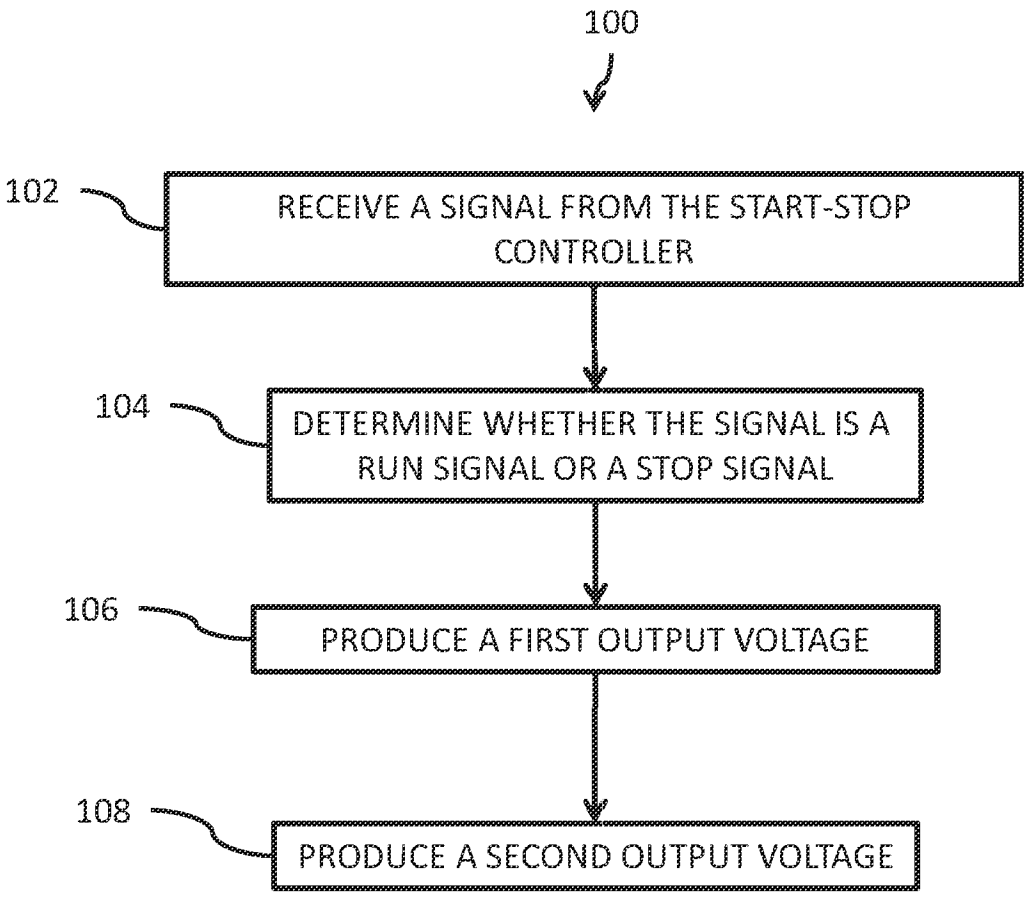
FIG. 2 is a flow chart of a method of operating the electrical power supply device of FIG. 1, according to one embodiment.

FIG. 2 illustrates a method 100 of operating the PD device 10 having the DC convertor 14 and the device controller 16 and in communication with the start-stop controller 20. The method 100 includes the following steps:

STEP 102, RECEIVE A SIGNAL FROM THE START-STOP CONTROLLER, includes the PD device 10 receiving a signal from the start-stop controller 20;

STEP 104, DETERMINE WHETHER THE SIGNAL IS A RUN SIGNAL OR A STOP SIGNAL, includes the device controller 16 determining whether the signal is a run signal or a stop signal;

STEP 106, PRODUCE A FIRST OUTPUT VOLTAGE, includes the PD device 10 producing the higher output voltage via the DC convertor 14 in accordance with the device controller 16 determining that the signal is the run signal; and STEP 108, PRODUCE A SECOND OUTPUT VOLTAGE, includes the PD device 10 producing a second output voltage via the DC convertor 14 which is less than the first output voltage in accordance with the device controller 16 determining that that the signal is the stop signal.

According to a particular embodiment, if the PD device 10 has negotiated a PD contract with a consumer device (not shown) at 100 watts i.e. the output voltage is 20 volts and current capacity is 5 amperes and a start-stop event occurs, in the vehicle 12, i.e. the start-stop controller 20 sends a stop signal, the PD device 10 will change the power negotiation from 100 watts to 15 watts, i.e. output voltage is 5 volts and current capacity is 3 amperes, thereby reducing power required to be supplied to the PD device 10 by the vehicle 12 and reducing the current drawn by the PD device 10 and staying within the limits of the circuits current protection devices. Per the USB PD specifications, the consumer device will select the new 15-watt capability. After the stop-start event ends, i.e. the start-stop controller 20 sends a run signal, the PD device 10 will renegotiate 100-watt capability and the consumer device will choose highest power needed.

Accordingly, an electrical power supply device, e.g. a USB PD device 10, and a method 100 of operating such a device is provided. The device provides the benefit of a USB PD device 10 that is capable of uninterrupted supply of power from the PD device 10 to a consumer USB device during a start-stop event in a vehicle 12. This USB PD device 10 may also provide the benefit of reducing or "shedding" electrical load from the vehicle's electrical system by reducing, but not discontinuing, the power supplied to the USB consumer device, e.g. reducing power supplied from 100 watts to 15 watts, which may allow the start-stop controller 20 to enter the start-stop mode.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An electrical power supply device configured to communicate with a start-stop controller that automatically shuts down and restarts an internal combustion engine in a vehicle, comprising:

a USB transceiver;

a DC-DC power convertor configured to produce a first voltage or a second voltage that is less than the first voltage; and a device controller which causes:

the DC-DC power convertor to output the first voltage in response to the USB transceiver receiving a first USB signal indicating the run signal from the start-stop controller; and the DC-DC power convertor to output the second voltage in response to the USB transceiver receiving [a] *the* first USB signal indicating the run signal from the start-stop controller *and subsequently receiving a second USB signal indicating a stop signal from the start-stop controller*.

2. The electrical power supply device according to claim 1, wherein a maximum value of the first voltage is 20 volts and a minimum value of the second voltage is 3.2 volts.

3. The electrical power supply device according to claim 1, further comprising interface circuitry to communicate between the start-stop controller and the device controller, wherein the interface circuitry comprises at least one selected from a list consisting of a controller area network (CAN) transceiver, a local interconnect network (LIN) transceiver, a Universal Serial Bus (USB) transceiver, and an input voltage detection circuit.

4. The electrical power supply device according to claim 1, wherein the device controller further comprises a processor and non-volatile memory which contains instructions which causes the DC-DC power convertor to produce the first voltage in response to a run signal from the start-stop controller and *causes* the DC-DC power convertor to produce the second voltage in response to a stop signal from the start-stop controller.

5. An electrical power supply device configured to communicate with a start-stop controller that automatically shuts down and restarts an internal combustion engine in a vehicle, comprising:

a USB transceiver;

a DC-DC power convertor configured to produce a first voltage or a second voltage that is less than the first voltage; and a device controller which:

causes the DC-DC power convertor to produce the first voltage in response to a run signal from the start-stop controller, causes the DC-DC power convertor to produce the second voltage in response to *the run signal from the start-stop controller followed by* a stop signal from the start-stop controller;

negotiates a power delivery contract with a consumer device at a first output power in response to the USB transceiver receiving a first USB signal indicating the run signal from the start-stop controller, and renegotiates the power delivery contract with the consumer device at a second output power less than the first output power in response to the USB transceiver receiving [a] *the* first USB signal indicating the run signal from the start-stop controller *and subsequently receiving a second USB signal indicating the stop signal from the stop start controller*.

6. The electrical power supply device according to claim 5, wherein the device controller renegotiates the power delivery contract with the consumer device at the first output power in response to the USB transceiver receiving the first USB signal indicating the run signal from the start-stop controller.

7. The electrical power supply device according to claim 5, wherein the first output power is 100 watts and the second output power is 15 watts.

8. The electrical power supply device according to claim 5, wherein a maximum value of the first voltage is 20 volts and a minimum value of the second voltage is 3.2 volts.

9. The electrical power supply device according to claim 5, further comprising interface circuitry to communicate between the start-stop controller and the device controller, wherein the interface circuitry comprises at least one selected from a list consisting of a controller area network (CAN) transceiver, a local interconnect network (LIN) transceiver, a Universal Serial Bus (USB) transceiver, and an input voltage detection circuit.

10. The electrical power supply device according to claim 5, wherein the device controller further comprises a processor and non-volatile memory which contains instructions which causes the DC-DC power convertor to produce the first voltage in response to a run signal from the start-stop controller and *causes* the DC-DC power convertor to produce the second voltage in response to a stop signal from the start-stop controller.

11. An electrical power supply device configured to interface with a start-stop controller within a vehicle, comprising:

a USB transceiver;

a DC-DC power convertor configured to produce a first voltage or a second voltage that is less than the first voltage; and a means for commanding the DC-DC power convertor to produce the first voltage in response to a run signal from the start-stop controller and for commanding the DC-DC power convertor to produce the second voltage in [in] response to *the run signal from the start-stop controller followed by* a stop signal from the start-stop controller, wherein the electrical power supply device further comprises means for communication with the USB transceiver and wherein the means for commanding the DC-DC power convertor causes:

the DC-DC power convertor to output the first voltage in response to the USB transceiver receiving a first USB signal indicating the run signal from the start-stop controller; and the DC-DC power convertor to output the second voltage in response to the USB transceiver receiving [a] *the* first USB signal indicating the run signal from the start-stop controller *and subsequently receiving a second USB signal indicating a stop signal from the start-stop controller*.

12. The electrical power supply device according to claim 11, wherein a maximum value of the first voltage is 20 volts and a minimum value of the second voltage is 3.2 volts.

13. The electrical power supply device according to claim 11, further comprising means for establishing communication between the start-stop controller and the means for commanding the DC-DC power convertor, wherein the means for establishing communication comprises at least one selected from a list consisting of a controller area network (CAN) transceiver, a local interconnect network (LIN) transceiver, a USB transceiver, and an input voltage detection circuit.

14. An electrical power supply device configured to interface with a start-stop controller within a vehicle, comprising:

a USB transceiver;

a DC-DC power convertor configured to produce a first output power or a second output power that is less than the first output power; and a means for commanding the DC-DC power convertor to produce the first output power in response to a run signal from the start-stop controller and for commanding the DC-DC power convertor to produce the second output power in [in] response to *the run signal from the start-stop controller followed by* a stop signal from the start-stop controller, wherein the means for commanding the DC-DC power convertor causes:

negotiation of a power delivery contract with a consumer device at the first output power in response to the USB transceiver receiving a first USB signal indicating the run signal from the start-stop controller, and renegotiation of the power delivery contract with the consumer device at the second output power in response to the USB transceiver receiving [a] *the* first USB signal indicating the run signal from the start-stop controller *and subsequently receiving a second USB signal indicating the stop signal from the start-stop controller*.

15. The electrical power supply device according to claim 14, wherein the means for commanding the DC-DC power convertor causes renegotiation of the power delivery contract with the consumer device at the first output power in accordance with the USB transceiver transmitting the first USB signal indicating that the start-stop controller has transmitted the run signal.

16. The electrical power supply device according to claim 14, wherein the first output power is 100 watts and the second output power is 15 watts.

* * * * *